UNITED STATES PATENT OFFICE.

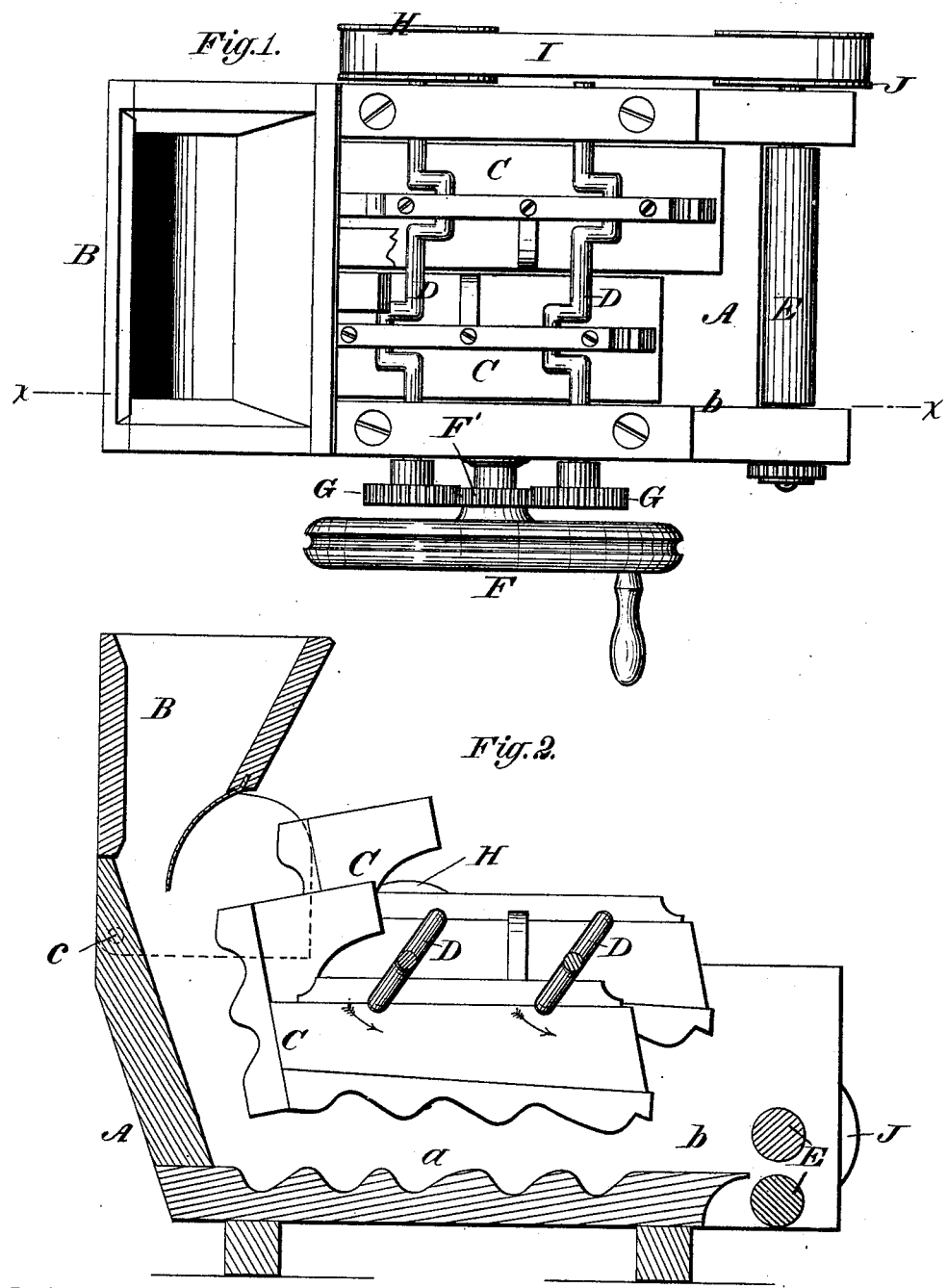

STEPHEN L. DOWS AND WILLIAM N. BERKELEY, OF CEDAR RAPIDS, IOWA.

IMPROVEMENT IN DOUGH-KNEADERS.

Specification forming part of Letters Patent No. 214,374, dated April 15, 1879; application filed January 13, 1879.

*To all whom it may concern:*

Be it known that we, STEPHEN L. DOWS and WILLIAM N. BERKELEY, of Cedar Rapids, in the county of Linn and State of Iowa, have invented certain Improvements in Machines for Working Dough, &c., of which the following is a specification.

Our invention consists in the combination of a fixed horizontal surface and an elongated horizontal head arranged to move repeatedly toward and lengthwise in relation to said surface; in a peculiar arrangement of operating devices, a feed-hopper, and delivery-rolls, as hereinafter described.

Figure 1 represents a top-plan view of a dough-kneading machine constructed in accordance with our plan; Fig. 2, a longitudinal vertical section of the same on the line *x x*.

A represents the frame of the machine, consisting of a transversely-corrugated bed, *a*, provided with two upright sides, *b*. B represents a hopper attached to the head of the frame by means of a hinge or pivot, *c*, which admits of its being turned backward out of the way, in order to admit of the parts being the more readily cleansed. C C represent two parallel worker-heads, mounted side by side above the bed, and sustained at their ends upon two crank-shafts, D, which extend across and have their ends mounted in the sides of the frame, as shown. The crank-shafts are geared together, as shown in Fig. 1, so that they both turn in the same direction, and are so arranged that while maintaining the heads in a horizontal position they carry them downward and outward, and then upward and back to their original position, whereby they are caused to act upon the dough beneath them with a motion very similar to that of the human hand in kneading dough in the usual manner.

As shown in the drawings, the heads C have their rear ends, or ends nearest the hopper, extended upward, and have the faces of the ends, and also their under faces, corrugated in the manner represented in Fig. 2.

The cranks are so constructed that the two heads are depressed and elevated alternately, and the under side of the hopper curved, as shown in Fig. 2, so that the ends of the heads descend closely past the mouth of the hopper, whereby they are caused to draw the dough downward therefrom.

At the outer end of the bed *a* there are mounted two transverse rolls, E, between which the dough passes, and by which it is rolled out into a thin sheet.

The gearing of the machine is clearly shown in Fig. 1, in which it will be seen that a flywheel, F, provided with a hand-crank, carries a pinion, F', which gears into pinions G on the ends of the two crank-shafts. One of the crank-shafts is provided with a pulley, H, from which a belt, I, extends to a pulley, J, on one of the rolls, which latter carry pinions gearing into each other.

The dough being placed in the hopper is drawn from its mouth by the ends of the heads and kneaded against the end of the body, and then passed downward and forward between the bed and the heads, and finally delivered in sheet form between the rolls. The downward and forward action of the heads upon the top of the dough, moving or rolling the same forward while it is retained below by the immovable surface, causes a thorough working and kneading, which, especially in view of the fact that the dough is also worked sidewise by the alternate action of the two heads, causes the requisite amount of air to be incorporated therein. The best and most uniform results are secured when the bed is mounted on supporting-springs, so that it may yield under excessive pressure.

There may be any desired number of the heads, and they may be given the motion described by cams or other devices in place of the cranks.

While the machine is more particularly designed for working dough, it is well adapted for working butter and for similar purposes.

Having thus described our invention, what we claim is—

1. The combination of the horizontal transversely-corrugated bed *a* and one or more positively-actuated transversely-corrugated heads, C, having a repeated downward and forward movement in relation to the bed without departure from their horizontal positions.

2. The combination of the body having the corrugated bed and upwardly-extending end with the head or heads, arranged to operate in the manner shown, and provided with corrugations in the under side and end.

3. The combination of a horizontal bed, an elongated presser-head, and operating devices, substantially such as shown, arranged to impart positively to the head repeated movements toward and lengthwise of the bed while retaining it in its horizontal position.

4. The combination of the bed $a$, the elongated head C, and two crank-shafts, arranged to support and operate the two ends of the heads, as shown.

5. The combination of the bed $a$, the hopper, and the heads C, arranged to deliver the material from the hopper to the bed, as described and shown.

6. The combination of the bed $a$, the two rolls E, located at the end of the bed, and the downwardly and forwardly moving head arranged to work the material and deliver the same automatically and continuously to the rolls.

STEPHEN L. DOWS.
WILLIAM N. BERKELEY.

Witnesses:
U. C. BLAKE,
T. J. DUDLEY.